United States Patent
Andrews

(10) Patent No.: US 6,726,858 B2
(45) Date of Patent: Apr. 27, 2004

(54) METHOD OF FORMING LENTICULAR SHEETS

(75) Inventor: Anna Catherine Andrews, Medina, OH (US)

(73) Assignee: Ferro Corporation, Cleveland, OH (US)

( * ) Notice: Subject to any disclaimer, the term of this patent is extended or adjusted under 35 U.S.C. 154(b) by 490 days.

(21) Appl. No.: 09/880,546

(22) Filed: Jun. 13, 2001

(65) Prior Publication Data

US 2003/0025224 A1 Feb. 6, 2003

(51) Int. Cl.⁷ .............................................. B29D 11/00
(52) U.S. Cl. ........................ 264/1.1; 264/1.7; 264/132; 359/619
(58) Field of Search .......................... 264/1.1, 1.7, 1.9, 264/1.31, 1.32, 132, 255; 359/619, 626

(56) References Cited

U.S. PATENT DOCUMENTS

| | | | |
|---|---|---|---|
| 4,920,039 A | | 4/1990 | Fotland et al. ............... 430/324 |
| 5,113,213 A | * | 5/1992 | Sandor et al. ................. 355/22 |
| 5,330,799 A | | 7/1994 | Sandor et al. ............... 427/510 |
| 5,359,454 A | | 10/1994 | Steenblik et al. ........... 359/463 |
| 5,554,432 A | | 9/1996 | Sandor et al. ............... 428/157 |
| 5,581,402 A | | 12/1996 | Taylor ......................... 359/463 |
| 5,924,870 A | | 7/1999 | Brosh et al. ................. 434/365 |
| 5,933,228 A | | 8/1999 | Taylor et al. ................ 356/124 |
| 6,091,482 A | | 7/2000 | Carter et al. ................... 355/79 |
| 6,154,247 A | | 11/2000 | Marino et al. ............... 347/256 |
| 6,169,633 B1 | | 1/2001 | Watanabe .................... 359/626 |
| 6,185,042 B1 | | 2/2001 | Lomb et al. ................. 359/619 |
| 6,329,987 B1 | * | 12/2001 | Gottfried et al. ........... 345/419 |
| 6,424,467 B1 | * | 7/2002 | Goggins ...................... 359/626 |

OTHER PUBLICATIONS

Clarke, "Now You See It, Now You See . . . , " Lenticular Imaging, Part 1, Screen Graphics, Sep./Oct. 1999, pp. 36–47.

Clarke, "Total Engineering: The Key to Lenticular Success," Lenticular Imaging, Part II, Screen Graphics, Jan./Feb. 2000, pp. 30–37.

* cited by examiner

*Primary Examiner*—Mathieu D. Vargot
(74) *Attorney, Agent, or Firm*—Rankin, Hill, Porter & Clark LLP

(57) ABSTRACT

The present invention provides a method of forming a lenticular sheet for use in forming a substantially ghost-free lenticular image. In a preferred embodiment, the method according to the invention includes providing a means for forming a lenticular sheet and forming the lenticular sheet out of a polymeric material using the means such that the lenticular sheet has an actual thickness ($d_a$) that is within about ±15% of an optimal thickness ($d_o$) as determined according to the formula: $d_o = (ns-1)r/s(n-1)$, wherein n is the refractive index of the polymeric material, s is the number of interlaced scenes in the lenticular image, and r is the radius of the lenticles formed using the means. In another embodiment, the method according to the invention includes providing a means for forming a lenticular sheet and forming the lenticular sheet out of a polymeric material using the means such that the lenticles have an actual radius ($r_a$) that is within about ±15% of the optimal radius ($r_o$) determined according to the formula: $r_o = (n-1)sd_a/(ns-1)$, wherein n is the refractive index of a polymeric material from which the lenticular sheet is to be formed, s is the number of interlaced scenes in the lenticular image, and $d_a$ is the predetermined actual thickness of the lenticular sheet. In yet another embodiment, the method according to the invention includes providing a means for forming a lenticular sheet and forming the lenticular sheet from a polymeric material using the means, wherein the polymeric material has an actual refractive index ($n_a$) that is within ±3% of an optimal refractive index ($n_o$) as determined according to the formula: $n_o = (r_a - sd_a)/s(r_a - d_a)$, wherein $r_a$ is the actual radius of each lenticle in the lenticular sheet, s is the number of interlaced scenes in the lenticular image, and $d_a$ is the predetermined actual thickness of the lenticular sheet.

20 Claims, No Drawings

METHOD OF FORMING LENTICULAR SHEETS

FIELD OF INVENTION

The present invention relates generally to the field of lenticular imaging, and in particular, to a method of forming a lenticular sheet for use in forming a substantially ghost-free lenticular image.

BACKGROUND OF THE INVENTION

Lenticular images, which are well known, comprise a plurality of interlaced scenes that are printed directly on or affixed adjacent to a generally planar bottom surface of a lenticular sheet. The opposing top surface of the lenticular sheet typically comprises a plurality of convex lenticles that are parallel to each other and the interlaced scenes printed on the bottom surface of the lenticular sheet. When viewed in cross-section, the top surface of each lenticle in the lenticular sheet typically has either a circular or an elliptical profile.

The individual lenticles act as lenses that are intended to allow an observer to view only a single interlaced scene at a particular viewing angle. As the viewing angle changes, the viewer should view a different interlaced scene. Because the scene observed changes as a function of viewing angle, it is possible to dissect and sequentially print interlaced scenes to form lenticular images that appear to an observer as a motion picture or video clip.

A number of means are known for forming lenticular sheets. These means include machining, platen pressing, injection or compression molding, extrusion embossment, and casting. For reasons of cost and manufacturing ease, lenticular sheets are typically formed from polymeric materials. But other materials such as glass can be used.

Machining is used primarily to manufacture large, one-of-a-kind, lenticular sheets from thick plastic sheets or plates. Milling machines or lathes equipped with diamond tipped cutting tools can be used to fabricate lenticular sheets of this type. It will be appreciated that machining is a slow and costly process, and thus it is not particularly suitable for high volume production of lenticular sheets.

A platen press can be used to stamp or emboss a lenticular pattern into a polymeric material. In such applications, the polymeric material typically comprises a thermosetting material. The temperature of the thermosetting polymeric material is raised to soften the material so that it conforms to the embossed surface. The temperature is then reduced to harden the polymeric material so that it retains the lenticular pattern when removed from the platen press. Like machining, this method is relatively slow and expensive. Furthermore, the size of the lenticular sheets that can be produced by this process is limited by the size of the press. Accordingly, this method is not particularly suitable for high volume production of lenticular sheets. The same disadvantages are present with injection or compression molding techniques, wherein the lenticular sheet is formed by injecting or compressing a molten polymer into a mold that includes a lenticular pattern on one side.

By far, the most common method of fabricating lenticular sheets is by extrusion embossment. Typically, extrusion embossment involves the use of an embossed roll, that may or may not be chilled. A molten polymeric material, which is typically thermoplastic rather than thermosetting, is extruded onto the embossed roll where it conforms to and thus is imprinted with the lenticular relief pattern. As the polymeric material cools, it retains the embossed lenticular pattern and is pulled from the embossed roll.

Although lenticular images have been produced since at least as early as the 1950's, the quality of most lenticular images has not been particularly good. Most known lenticular images suffer from a phenomenon known within the art as "ghosting," which describes an observer's ability to see more than one interlaced scene at a particular viewing angle. A viewer of a lenticular image that contains "ghosts" will see phantom scenes within the image. For example, if the lenticular image comprises a series of interlaced scenes whereby the letter "C" changes or "morphs" into an image of a cat, a ghost in the form of all or some of the "C" image may be observed in the final cat image.

The current practice in the field of lenticular imaging is to try to eliminate the appearance of ghosting and other undesirable artifacts in lenticular images through trial and error. Lenticular film fabricators usually attempt to address ghosting by randomly varying the lenticular sheet by changing the lens frequency or the thickness of the lenticular sheet. Some printers of lenticular images address ghosting by inserting colored strips between interlaced scenes in an attempt to further separate and differentiate them. These trial and error techniques rarely yield substantially ghost-free images and are implemented at high cost. For example, a lenticular sheet fabricator who decides to vary the lens frequency does so by having a new embossing roll manufactured. Embossing rolls are relatively expensive, and without proper guidance, a new embossing roll may not solve the ghosting problem.

A method is needed whereby fabricators of lenticular sheets and printers of lenticular images can determine the proper geometry and/or thickness of a lenticular sheet suitable for use in forming a substantially ghost-free lenticular image for use in a particular lenticular image forming application. Preferably, the method would permit lenticular sheet fabricators to use existing inventories of embossing rolls and other means for forming lenticular sheets, and thus avoid the expense and time needed to obtain other suitable means.

SUMMARY OF INVENTION

The present invention provides a method of forming a lenticular sheet for use in forming a substantially ghost-free lenticular image. The method according to the invention comprises providing a means for forming a lenticular sheet and forming the lenticular sheet out of a polymeric material using the means such that the lenticular sheet has an actual thickness ($d_a$) that is within about ±15% of an optimal thickness ($d_o$) as determined according to the formula: $d_o=(ns-1)r/s(n-1)$, wherein n is the refractive index of the polymeric material, s is the number of interlaced scenes in the lenticular image, and r is the radius of the lenticles formed using the means. Suitable means for forming a lenticular sheet according to the method of the invention include machining, platen pressing, injection molding, compression molding, extrusion embossment, and casting, with extrusion embossment being presently most preferred.

For some lenticular imaging applications, it is desirable to form a lenticular sheet having a predetermined thickness $d_a$. In such instances, the method of the present invention comprises providing a means for forming a lenticular sheet and forming the lenticular sheet out of a polymeric material using the means such that the lenticles have an actual radius ($r_a$) that is within about ±15% of the optimal radius ($r_o$) determined according to the formula: $r_o=(n-1)sd_a/(ns-1)$, wherein n is the refractive index of a polymeric material from which the lenticular sheet is to be formed, s is the number of interlaced scenes in the lenticular image, and $d_a$ is the predetermined actual thickness of the lenticular sheet.

In some lenticular imaging applications it is possible to obtain substantially ghost-free lenticular images by selecting a polymeric material having a proper refractive index. Accordingly, in another embodiment of the method of the present invention, the method comprises providing a means for forming a lenticular sheet and forming the lenticular sheet from a polymeric material using the means, wherein the polymeric material has an actual refractive index ($n_a$) that is within ±3% of an optimal refractive index ($n_o$) as determined according to the formula: $n_o = (r_a - sd_a)/s(r_a - d_a)$, wherein $r_a$ is the actual radius of each lenticle in the lenticular sheet, s is the number of interlaced scenes in the lenticular image, and $d_a$ is the predetermined actual thickness of the lenticular sheet.

In all cases, it is preferable for the lenticular sheet to have an actual frequency ($LPI_a$) in lenticles per inch that is within about ±20% of an optimal frequency ($LPI_o$) in lenticles per inch as determined according to the formula: $LPI_o = L\theta_{min}$, where L is the predetermined optimal viewing distance of the lenticular image in inches and $\theta_{min}$ is a predetermined minimum visual acuity value for an observer selected within the range of from about 0.0002 to about 0.0005.

By employing the method of the present invention, lenticular sheet fabricators can readily determine the proper geometry, thickness, and/or refractive index of the polymeric material being used in order to form a substantially ghost-free lenticular image for a particular lenticular image forming application. The method of the present invention eliminates the guesswork and waste incurred in conventional lenticular sheet production and allows for the production of high quality, substantially ghost-free lenticular images.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a method of forming a lenticular sheet for use in forming a substantially ghost-free lenticular image. Throughout the instant specification and in the appended claims, the term "substantially ghost-free" means that a viewer cannot observe more than one interlaced scene at a particular viewing angle when the lenticular image is viewed at the optimal viewing distance. Notwithstanding the foregoing, it will be appreciated that because an observer's eyes are spaced apart a distance, and thus are at slightly different viewing angles relative to the lenticular sheet, some very minor artifacts such as faint ghosts may actually be observed by some viewers in a substantially ghost-free lenticular image. This is particularly true when the viewing distance from the observer's eyes and the lenticular image is relatively small. Any ghosts that can be observed in a substantially ghost-free lenticular image will, however, generally be limited to the adjacent interlaced scene only. Additionally, variations between particular observers' eyesight can result in one observer being able to detect a small degree of ghosting in a lenticular image that another observer cannot otherwise detect.

Applicants have discovered that in order to obtain a substantially ghost-free lenticular image, it is critical that the magnification of the lenticles of the lenticular sheet be matched, within a reasonable margin of error, to the number of interlaced scenes in the lenticular image. Each lenticle in a lenticular sheet magnifies the image of the material situated directly beneath it. As the viewing angle changes, a different scene is brought into view because the lenticle focuses on a different location. If more than one interlaced scene can be viewed at a particular viewing angle, undesired artifacts such as ghosting are observed. By matching the magnification of the lenticles in the lenticular sheet to the number of scenes present in the image, the lenticular sheet performs its task in an optimum manner. The lenticles of the lenticular sheet magnify the printed image in such a manner so as to create a virtual image that appears to be located behind the lenticular sheet.

One way to control the magnification of the lenticular sheet is to adjust the thickness of the lenticular sheet. The thickness of a lenticular sheet is typically measured using calipers, with the term "thickness" describing the distance from the flat bottom surface of the lenticular sheet to the highest point on the convex top surface of a lenticle. The optimal thickness ($d_o$) of a lenticular sheet can be determined according to the following formula:

$$d_o = \frac{(ns-1)r}{s(n-1)}$$

wherein n is the refractive index of the polymeric material from which the lenticular sheet is being formed, s is the number of interlaced scenes in the lenticular image, and r is the radius of the lenticles on the lenticular sheet. The radius of a lenticle is defined as being the radius of a circle that would overlap the profile of the lenticle when viewed in cross-section. For lenticles having an elliptical cross-section, the radius is defined as being the radius of a circle that most completely overlaps the profile of the lenticle when viewed in cross-section.

In the best case, it would be desirable to have the actual thickness ($d_a$) of the lenticular sheet match the optimal thickness ($d_o$) for the particular application. However, it is generally acceptable for the actual thickness ($d_a$) to be within ±15% of the optimal thickness ($d_o$) for the particular application. More preferably, the actual thickness ($d_a$) is within ±10% of the optimal thickness ($d_o$). In the most preferred embodiment of the invention, the actual thickness ($d_a$) is within ±5% of the optimal thickness ($d_o$).

As noted above, it is critical that the magnification of the lenticles of the lenticular sheet be matched, within a reasonable margin of error, to the number of interlaced scenes in the lenticular image. However, this does not necessarily mean that each of the interlaced scenes must be different. It only means that the magnification of the lenticles of the lenticular sheet be matched to the total number of interlaced scenes comprising the lenticular image. To illustrate the foregoing point, suppose a printer desires to print a lenticular image that includes three different scenes or pictures that change as a function of the observer's viewing angle relative to the lenticular image. For purposes of this illustration, the three different scenes or pictures are represented by the characters A, B and C. There are several options available to the printer. The printer could use a lenticular sheet having lenticles with a magnification suitable for use with three interlaced scenes. In such a circumstance, the area under each lenticle would be printed with the interlaced scenes: ABC. Alternatively, the printer could use a lenticular sheet having lenticles with a magnification suitable for use with a multiple of three interlaced scenes, such as a lenticular sheet having lenticles with a magnification suitable for use with twelve interlaced scenes. In such a circumstance, the area under each lenticle would be printed with the interlaced scenes: AAAABBBBCCCC. In either case, an observer would see a substantially ghost-free lenticular image containing three scenes that smoothly change as a function of the observer's viewing angle relative to the lenticular sheet.

For some applications, it is sometimes necessary to fabricate the lenticular sheet such that it has a predetermined thickness. In such cases, the magnification of the lenticular sheet can be controlled by adjusting the radius of the lenticles. The optimal radius ($r_o$) of a lenticular sheet can be determined according to the following formula:

$$r_o = \frac{(n-1)sd_a}{(ns-1)}$$

wherein n is the refractive index of a polymeric material from which the lenticular sheet is to be formed, s is the number of interlaced scenes in the lenticular image, and $d_a$ is the predetermined actual thickness of the lenticular sheet.

In the ideal case, it would be desirable to have the actual radius ($r_a$) of the lenticular sheet match the optimal radius ($r_o$) for the particular application. However, it is generally acceptable for the actual radius ($r_a$) to be within ±15% of the optimal radius ($r_o$) for the particular application. More preferably, the actual radius ($r_a$) is within ±10% of the optimal radius ($r_o$). In the most preferred embodiment of the invention, the actual radius ($r_a$) is within ±5% of the optimal radius ($r_o$).

Sometimes, it is also possible to adjust the magnification of the lenticular sheet by selecting a polymeric material having an appropriate refractive index for the particular application or by adjusting the refractive index of the polymeric material using certain additives. The optimal refractive index ($n_o$) of a lenticular sheet can be determined according to the following formula:

$$n_o = \frac{(r_a - sd_a)}{s(r_a - d_a)}$$

wherein $r_a$ is the actual radius of each lenticle in the sheet, s is the number of interlaced scenes in the lenticular image, and $d_a$ is the predetermined actual thickness of the lenticular sheet.

Clearly, it would be desirable to have the actual refractive index ($n_a$) of the polymeric material used to fabricate the lenticular sheet match the optimal refractive index ($n_o$) for the particular application. However, it is generally acceptable for the actual refractive index ($n_a$) to be within ±3% of the optimal refractive index ($n_o$) for the particular application. More preferably, the actual refractive index ($n_a$) is within ±2% of the optimal refractive index ($n_o$). In the most preferred embodiment of the invention, the actual refractive index ($n_a$) is within ±1% of the optimal refractive index ($n_o$).

While certainly an option, applicants believe that changing the refractive index of the polymeric material or selecting a polymeric material with a specified refractive index will seldom be the best option for a given lenticular imaging application. Process limitations and other factors such as the need to use specified polymers (which precludes the selection of a different polymer having different refractive index) and/or the need to maintain optical clarity (presently, there are relatively few refractive index altering additives that do not also adversely affect the optical clarity of the polymeric material) can make controlling the magnification of the lenticular sheet via adjustment/selection of the refractive index of the polymer very difficult to accomplish. Furthermore, many of the polymers used in the production of lenticular sheets have refractive indices that are relatively close.

In every case, it is preferable for the frequency of the lenticular sheet (i.e., the number of lenticles per unit of distance, typically inches) to be appropriate for the particular application. Frequency is limited by the minimum visual acuity of the observer and the ability of printers to interlace images. If the frequency is too small, the image may appear to the observer as a series of stripes rather than as the desired image. If the frequency of the lenticular sheet is too large, it will be difficult for the printer to accurately print the interlaced scenes in the lenticular image.

The optimal frequency ($LPI_o$) in lenticles per inch for a lenticular sheet can be determined according to the following formula:

$$LPI_o = \frac{1}{L\theta_{min}}$$

wherein L is the predetermined optimal viewing distance of the lenticular image in inches and $\theta_{min}$ is a predetermined minimum visual acuity value for an observer. The minimum visual acuity value for humans typically ranges from about 0.0002 to about 0.0005. For ease in making calculations, a minimum visual acuity value of 0.00035 is typically used.

Obviously, it would be desirable to have the actual frequency ($LPI_a$) of the lenticular sheet match the optimal frequency ($LPI_o$) for the particular application. However, it is generally acceptable for the actual frequency ($LPI_a$) to be within ±40% of the optimal frequency ($LPI_o$) for the particular application. More preferably, the actual frequency ($LPI_a$) is within ±20% of the optimal frequency ($LPI_o$). In the most preferred embodiment of the invention, the actual frequency ($LPI_a$) is within ±10% of the optimal frequency ($LPI_o$).

$LPI_a$ is permitted to deviate from $LPI_o$ over a relatively broad range to account for the tendency of human observers to move closer to or farther away from lenticular images than the distance at which they were intended to be viewed by the designer. For example, a lenticular image that is placed in the aisle of a grocery store might have a predetermined optimal viewing distance of three feet, being roughly half the width of an aisle in a typical grocery store. In practice, however, observers viewing the lenticular image might actually view the image from a distance that is ±1 foot from the optimal location due to the curiosities of the observers or variances in the width of aisles in grocery stores. This means that the uncertainty in viewing distance can be as much as 33% or more, which is why a relatively wider range for $LPI_a$ is acceptable.

The method according to the present invention can be used with any means for forming a lenticular sheet. Suitable means include, for example, machining, platen pressing, injection molding, compression molding, extrusion embossment, and casting. Extrusion embossment is the presently most preferred means for use in practicing the method of the invention due to considerations such as cost and ease of manufacturing.

One of the advantages of the method according to the present invention is that it allows lenticular sheet fabricators to create an inventory of embossment rolls or other lenticular sheet forming means that can be used to produce lenticular sheets suitable for use in forming substantially ghost-free lenticular images for specified applications. The method avoids the costs, time, and waste of prior art trial and error methods of addressing ghosting.

The following examples are intended only to illustrate the invention and should not be construed as imposing limitations upon the claims:

EXAMPLE 1

A lenticular sheet fabricator has been requested to supply a lenticular sheet suitable for use in forming a substantially ghost-free lenticular image containing 20 interlaced scenes that will be viewed by an observer at an optimal viewing distance of 3 feet. The lenticular sheet is to be formed from an amorphous polyethylene terephthalate (APET) sold by the Eastman Chemical Company under the trade designation EASTAPAK Polymer. The refractive index of the polymer is 1.575.

According to the method of the present invention, the fabricator initially determines the optimal frequency ($LPI_o$) of a lenticular sheet that would be suitable for use in this application according to the formula:

$$LPI_o = \frac{1}{L\theta_{\min}}$$

wherein L is the predetermined optimal viewing distance of the lenticular image in inches and $\theta_{min}$ is a predetermined minimum visual acuity value for an observer selected within the range from about 0.0002 to about 0.0005. Using a predetermined minimum visual acuity value of 0.00035, the optimal frequency ($LPI_o$) of the lenticular sheet is:

$LPI_o$=1/(36 inches×0.00035)=79.4 lenticles per inch

The lenticular sheet fabricator has an embossing roll in inventory that can be used to form a lenticular sheet having an actual frequency ($LPI_a$) of 75 lenticles per inch with lenticles having a radius of 0.006 inches. According to the method of the invention, the lenticular sheet fabricator can use the embossing roll in inventory because it will produce a lenticular sheet having an actual frequency ($LPI_a$) that is only 5.5% less than the optimal frequency ($LPI_o$) for this particular application, which is within the acceptable margin of ±20% of optimal frequency ($LPI_o$).

Next, the lenticular sheet fabricator must determine the proper thickness of the lenticular sheet to be made for this application using the embossing roll in inventory. According to the method of the invention, the optimal thickness ($d_o$) of the lenticular sheet is determined according to the formula:

$$d_o = \frac{(1.575 \times 20 - 1)0.006 \text{ inches}}{20(1.575 - 1)} = 0.0159 \text{ inches} = 15.9 \text{ mils}$$

wherein n is the refractive index of the polymeric material, s is the number of interlaced scenes in the lenticular image, and r is the radius of the lenticles formed using said means.

As noted above, the polymer has a refractive index of 1.575. The number of interlaced scenes in the lenticular image is 20. And, the radius of the lenticles formed using the embossing roll in inventory is 0.006 inches. Using these values, the optimal thickness ($d_o$) of the lenticular sheet for this application using the embossing roll in inventory is determined according to the method of the invention as being:

$$d_o = \frac{(ns-1)r}{s(n-1)}$$

Therefore, in order to supply a lenticular sheet formed from the specified polymeric material that is suitable for use in forming a substantially ghost-free lenticular image containing 20 interlaced scenes to be viewed by an observer at an optimal viewing distance of 3 feet, the lenticular sheet fabricator should manufacture the lenticular sheet such that it has an actual thickness ($d_a$) that is within ±20% of 15.9 mils using the embossing roll in inventory that will produce a lenticular sheet having a frequency of 75 lenticles per inch and lenticles having a radius of 0.006 inches.

EXAMPLE 2

A lenticular sheet fabricator has been requested to supply a lenticular sheet suitable for use in forming a substantially ghost-free lenticular image containing 10 interlaced scenes that will be viewed by an observer at an optimal viewing distance of 20 feet. The requestor has also specified that the lenticular sheet must have a thickness of 15 mils in order to function optimally with the requestor's printing equipment, and that it should be formed from an amorphous polyethylene terephthalate (APET) sold by the Eastman Chemical Company under the trade designation EASTAPAK Polymer. The refractive index of the polymer is 1.575.

According to the method of the present invention, the fabricator initially determines the optimal frequency ($LPI_o$) of a lenticular sheet that would be suitable for use in this application according to the formula:

$$LPI_o = \frac{1}{L\theta_{\min}}$$

wherein L is the predetermined optimal viewing distance of the lenticular image in inches and $\theta_{min}$ is a predetermined minimum visual acuity value for an observer selected within the range from about 0.0002 to about 0.0005. Using a predetermined minimum visual acuity value of 0.00035, the optimal frequency ($LPI_o$) of the lenticular sheet is:

$LPI_o$=1/(240 inches×0.00035)=11.9 lenticles per inch

Next, the lenticular sheet fabricator determines the optimal radius ($r_o$) of the lenticles of a lenticular sheet suitable for use in the application. According to the method of the invention, the optimal radius ($r_a$) is determined according to the formula:

$$r_o = \frac{(n-1)sd_a}{(ns-1)}$$

wherein n is the refractive index of the polymeric material from which the lenticular sheet is to be formed, s is the number of interlaced scenes in the lenticular image, and $d_a$ is the predetermined actual thickness of the lenticular sheet. As noted above, the refractive index of the polymeric material is 1.575, the number of interlaced scenes in the image is 10, and the actual thickness ($d_a$) of the lenticular sheet is 15 mils. Using these values, the optimal radius ($r_o$) of the lenticles in the lenticular sheet for this application is:

$$r_o = \frac{(1.575 - 1) \times 10 \times 0.015 \text{ inches}}{(1.575 \times 10 - 1)} = 0.005 \text{ inches}$$

Therefore, in order to supply a lenticular sheet formed from the specified polymeric material at the specified thickness that is suitable for use in forming a substantially ghost-free lenticular image containing 10 interlaced scenes to be viewed by an observer at an optimal viewing distance of 20 feet, the lenticular sheet fabricator should use an embossing roll for use in forming a lenticular sheet having an actual frequency ($LPI_a$) that is within ±20% of 11.9 lenticles per inch with lenticles having an actual radius ($r_a$) that is within ±20% of 0.005 inches.

Additional advantages and modifications will readily occur to those having skill in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A method of forming a lenticular sheet for use in forming a substantially ghost-free lenticular image, said method comprising:

providing a means for forming a lenticular sheet; and forming the lenticular sheet out of a polymeric material using said means, the lenticular sheet having an actual thickness ($d_a$) that is within about ±15% of an optimal thickness ($d_o$) as determined according to the formula:

$$d_o = \frac{(ns - 1)r}{s(n - 1)}$$

wherein n is the refractive index of the polymeric material, s is the number of interlaced scenes in the lenticular image, and r is the radius of the lenticles in the lenticular sheet.

2. The method according to claim 1 wherein said lenticular sheet has an actual frequency ($LPI_a$) in lenticles per inch that is within about ±40% of an optimal frequency ($LPI_o$) in lenticles per inch as determined according to the formula:

$$LPI_o = \frac{1}{L\theta_{min}}$$

where L is the predetermined optimal viewing distance of the lenticular image in inches and $\theta_{min}$ is a predetermined minimum visual acuity value for an observer selected within the range from about 0.0002 to about 0.0005.

3. The method according to claim 1 wherein said means for forming said lenticular sheet is selected from the group consisting of machining, platen pressing, injection molding, compression molding, extrusion embossment, and casting.

4. The method according to claim 2 wherein the actual frequency ($LPI_a$) of the lenticular sheet is within about ±20% of the optimal frequency ($LPI_o$).

5. The method according to claim 2 wherein the actual frequency ($LPI_a$) of the lenticular sheet is within about ±10% of the optimal frequency ($LPI_o$).

6. The method according to claim 1 wherein the actual thickness ($d_a$) of the lenticular sheet is within about ±10% of an optimal thickness ($d_o$).

7. The method according to claim 1 wherein the actual thickness ($d_a$) of the lenticular sheet is within about ±5% of an optimal thickness ($d_o$).

8. A method of forming a lenticular sheet having a predetermined actual thickness ($d_a$) for use in forming a substantially ghost-free lenticular image, said method comprising:

providing a means for forming a lenticular sheet having lenticles with an actual radius ($r_a$) measured in inches that is within about ±15% of the optimal radius ($r_o$) as determined according to the formula:

$$LPI_o = \frac{1}{L\theta_{min}}$$

wherein n is the refractive index of a polymeric material from which the lenticular sheet is to be formed, s is the number of interlaced scenes in the lenticular image, and $d_a$ is the predetermined actual thickness of the lenticular sheet; and forming the lenticular sheet from said polymeric material at the predetermined actual thickness ($d_a$) using said means.

9. The method according to claim 8 wherein said lenticular sheet has an actual frequency ($LPI_a$) in lenticles per inch that is within about ±40% of an optimal frequency ($LPI_o$) in lenticles per inch as determined according to the formula:

$$r_o = \frac{(n - 1)sd_a}{(ns - 1)}$$

where L is the predetermined optimal viewing distance of the lenticular image in inches and $\theta_{min}$ is a predetermined minimum visual acuity value for an observer selected within the range of from about 0.0002 to about 0.0005.

10. The method according to claim 8 wherein said means for forming a lenticular sheet is selected from the group consisting of machining, platen pressing, injection molding, compression molding, extrusion embossment, and casting.

11. The method according to claim 9 wherein the actual frequency ($LPI_a$) of the lenticular sheet is within about ±20% of the optimal frequency ($LPI_o$).

12. The method according to claim 9 wherein the actual frequency ($LPI_a$) of the lenticular sheet is within about ±10% of the optimal frequency ($LPI_o$).

13. The method according to claim 8 wherein the actual radius ($r_a$) of the lenticles is within about ±10% of the optimal radius ($r_o$).

14. The method according to claim 8 wherein the actual radius ($r_a$) of the lenticles is within about ±5% of the optimal radius ($r_o$).

15. A method of forming a lenticular sheet for use in forming a substantially ghost-free lenticular image, said method comprising:

providing a means for forming a lenticular sheet; and forming the lenticular sheet from a polymeric material using said means, the polymeric material having an actual refractive index ($n_a$) that is within ±3% of an optimal refractive index ($n_o$) as determined according to the formula:

$$n_o = \frac{(r_a - sd_a)}{s(r_a - d_a)}$$

wherein $r_a$ is the actual radius of each lenticle in the lenticular sheet, s is the number of interlaced scenes in the lenticular image, and $d_a$ is the predetermined actual thickness of the lenticular sheet.

16. The method according to claim 15 wherein said lenticular sheet has an actual frequency ($LPI_a$) in lenticles per inch that is within about ±40% of an optimal frequency ($LPI_o$) in lenticles per inch as determined according to the formula:

$$LPI_o = \frac{1}{L\theta_{min}}$$

where L is the predetermined optimal viewing distance of the lenticular image in inches and $\theta_{min}$ is a predetermined minimum visual acuity value for an observer selected within the range from about 0.0002 to about 0.0005.

17. The method according to claim 16 wherein the actual frequency ($LPI_a$) of the lenticular sheet is within about ±20% of the optimal frequency ($LPI_o$).

18. The method according to claim 16 wherein the actual frequency ($LPI_a$) of the lenticular sheet is within about ±10% of the optimal frequency ($LPI_o$).

19. The method according to claim 15 wherein the actual refractive index ($n_a$) of the polymeric material is within ±2% of the optimal refractive index ($n_o$).

20. The method according to claim 15 wherein the actual refractive index ($n_a$) of the polymeric material is within ±1% of the optimal refractive index ($n_o$).

* * * * *